US007302066B2

(12) United States Patent
Balan et al.

(10) Patent No.: US 7,302,066 B2
(45) Date of Patent: Nov. 27, 2007

(54) METHOD FOR ELIMINATING AN UNWANTED SIGNAL FROM A MIXTURE VIA TIME-FREQUENCY MASKING

(75) Inventors: Radu Victor Balan, West Windsor, NJ (US); Scott Rickard, Princeton, NJ (US); Justinian Rosca, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 833 days.

(21) Appl. No.: 10/678,372

(22) Filed: Oct. 3, 2003

(65) Prior Publication Data

US 2004/0136544 A1 Jul. 15, 2004

(51) Int. Cl.
*H04B 3/00* (2006.01)

(52) U.S. Cl. .................. 381/94.7; 381/94.1; 381/94.2; 381/94.3; 381/73.1; 704/233; 704/205

(58) Field of Classification Search .................. 381/61, 381/94.1-94.9, 73.1; 379/392; 704/233, 704/205

See application file for complete search history.

(56) References Cited

U.S. PATENT DOCUMENTS

| | | | | |
|---|---|---|---|---|
| 5,874,916 | A * | 2/1999 | Desiardins | 342/378 |
| 7,158,933 | B2 * | 1/2007 | Balan et al. | 704/226 |
| 2002/0126856 | A1 * | 9/2002 | Krasny et al. | 381/94.1 |
| 2002/0172378 | A1 * | 11/2002 | Bizjak | 381/106 |

OTHER PUBLICATIONS

Scott Richar,Radu, Blan and Justinian Rosca, Real-Time Time-Frequency Based Blind Source Seperation, Dec. 2001, ICA2001.*

* cited by examiner

*Primary Examiner*—Vivian Chin
*Assistant Examiner*—Disler Paul
(74) *Attorney, Agent, or Firm*—Donald B. Paschburg; F. Chau & Associates, LLC

(57) ABSTRACT

A method is presented for eliminating an unwanted signal (e.g., background music, interference, etc.) from a mixture of a desired signal and the unwanted signal via time-frequency masking. Given a mixture of the desired signal and the unwanted signal, the goal of the present invention is to eliminate or at least reduce the effects of the unwanted signal to obtain an estimate of the desired signal.

17 Claims, 10 Drawing Sheets

METHOD FOR ELIMINATING AN UNWANTED SIGNAL FROM A MIXTURE VIA TIME-FREQUENCY MASKING

BACKGROUND OF THE INVENTION

1. Field of the Invention

The present invention relates to the field of audio and signal processing, and, more particularly, to eliminating an unwanted signal from a mixture of a desired signal and an unwanted signal.

2. Description of the Related Art

A voice sample can be a mixture of a desired signal and an unwanted signal. For example, the desired signal may be a voice, and the unwanted signal may be background music. If the background music is of a sufficient auditory level in relation to the auditory level of the voice, the desired signal may be masked by the background music such that the desired signal cannot be clearly understood. Therefore, it would be advantageous to eliminate or reduce the unwanted signal from the recording such that the desired signal can be more clearly understood.

Classical techniques for eliminating an unwanted signal are the Widrow-Hoff techniques. The Widrow-Hoff techniques are prone to certain errors. It is sensitive to errors in phase estimates of a filter and an unwanted signal. It is also unreliable if a side signal and a mixture are not aligned properly.

SUMMARY OF THE INVENTION

In one aspect of the present invention, a method for eliminating or reducing an unwanted signal from a recorded mixture of a desired signal and an unwanted signal given an original recording of the unwanted signal is provided. The method includes aligning the recorded mixture and the original recording; computing a time-frequency representation of the recorded mixture to create a time-frequency recorded mixture; computing a time-frequency representation of the redefined original recording to create a time-frequency redefined original recording; determining a segment of time when only the redefined original recording is present in the recorded mixture; computing a value $\alpha(\omega)$; generating a time-frequency mask using the value $\alpha(\omega)$, the time-frequency recorded mixture and the time-frequency redefined original recording; applying the time-frequency mask on the recorded mixture to compute a time-frequency desired signal; and inverting the time-frequency desired signal to create a desired signal.

In another aspect of the present invention, a machine-readable medium having instructions stored thereon for execution by a processor to perform a method for eliminating or reducing an unwanted signal from a recorded mixture of a desired signal and an unwanted signal given an original recording of the unwanted signal is provided. The medium contains instructions for aligning the recorded mixture and the original recording; computing a time-frequency representation of the recorded mixture to create a time-frequency recorded mixture; computing a time-frequency representation of the redefined original recording to create a time-frequency redefined original recording; determining a segment of time when only the redefined original recording is present in the recorded mixture; computing a value $\alpha(\omega)$; generating a time-frequency mask using the value $\alpha(\omega)$, the time-frequency recorded mixture and the time-frequency redefined original recording; applying the time-frequency mask on the recorded mixture to compute a time-frequency desired signal; and inverting the time-frequency desired signal to create a desired signal.

In yet another embodiment of the present invention, a method for eliminating or reducing an unwanted signal from a recorded mixture of a desired signal and an unwanted signal given an original recording of the unwanted signal is provided. The method includes aligning the recorded mixture and the original recording; computing a time-scale representation of the recorded mixture to create a time-scale recorded mixture; computing a time-scale representation of the redefined original recording to create a time-scale redefined original recording; determining a segment of time when only the redefined original recording is present in the recorded mixture; computing a value $\alpha(\omega)$; generating a time-scale mask using the value $\alpha(\omega)$, the time-scale recorded mixture and the time-scale redefined original recording; applying the time-scale mask on the recorded mixture to compute a time-scale desired signal; and inverting the time-scale desired signal to create a desired signal.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
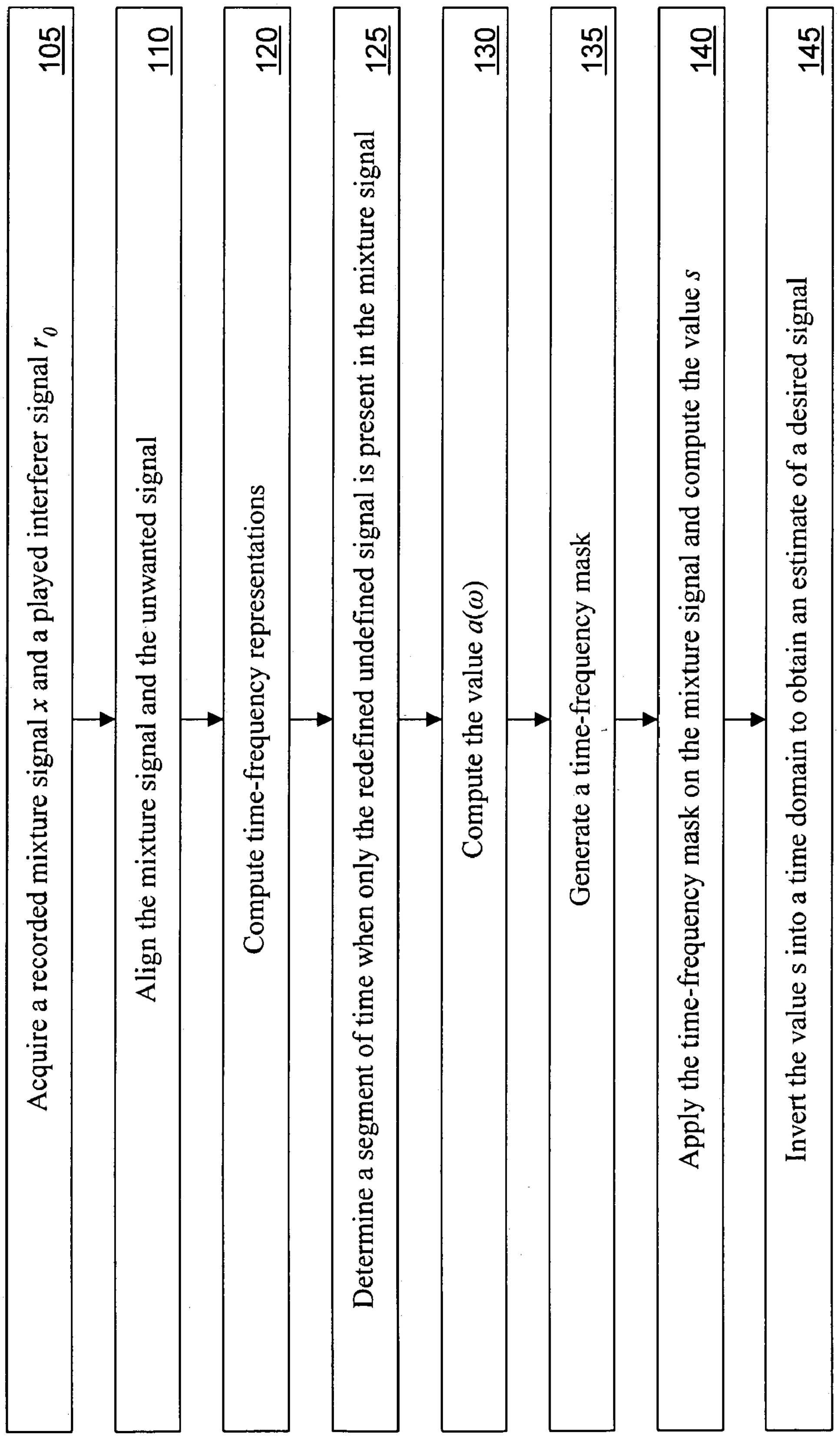
FIG. 1 depicts a flow diagram of a method for eliminating or reducing an unwanted signal, in accordance with one illustrative embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

A method is presented for eliminating an unwanted signal (e.g., background music, interference, etc.) from a mixture of a desired signal and the unwanted signal via time-frequency masking. Given a mixture of the desired signal and the unwanted signal, the goal of the present invention is to eliminate or at least reduce the effects of the unwanted signal to obtain an estimate of the desired signal. For example, although not so limited, the desired signal can be voice and the unwanted signal could be music. The goal, therefore, would be to eliminate or at least reduce the music from the mixture.

The method requires a side information signal, which is a signal with related instantaneous spectral powers to the unwanted signal. Such a signal is often available. For example, in the scenario where the unwanted signal is music from a digital recording (e.g., a compact disc) or an analog recording (e.g., a cassette tape), the original digital or analog recording can serve as the side information signal.

The method comprises three general steps, which are further elaborated through the present disclosure. First, the mixture and the side information signal are roughly aligned so that sounds in each occur approximately at the same time. Second, an estimate of the relationship (i.e., spectral weights) between the instantaneous spectral powers of the side information signal and its presence in the mixture is computed using a section of the mixture which contains little to no contribution from the desired signal but a relatively large contribution from the unwanted signal. Third, a time-frequency mask is created comparing the weighted instantaneous spectral powers of the side information Signal to the mixture instantaneous spectral powers. Time-frequency points which are likely dominated by the unwanted signal are suppressed to remove the unwanted signal from the mixture. The result is a clearer desired signal.

Consider a recording of a mixture of a desired signal, s(t), and an unwanted signal, r(t), $$x(t)=s(t)+r(t).$$

Although the present invention is not so limited, it is assumed solely for discussion purposes that the desired signal is voice and the unwanted signal is music. It is further assumed that the music signal in the recording was played on a stereo or the like, and that the original recording (i.e., the side information signal) is available, for example in the form of a cassette tape or compact disc. The original recording can be referred to as $r_0(t)$. The unwanted signal r(t) and original recording version $r_0(t)$ are clearly related, although in general $r(t)\neq r_0(t)$ because r(t) has been altered by the recording process, as is known to those skilled in the art. That is, r(t) is a filtered version of $r_0(t)$ and this transforming filter is unknown. The goal of the present invention is to estimate s(t) given x(t) and $r_0(t)$.

The mixing in the time-frequency domain can be expressed using the windowed Fourier transform. The windowed Fourier transform of x is defined, $$F^W(x(\cdot))(t,\omega)=\frac{1}{\sqrt{2\pi}}\int_{-\infty}^{\infty}W(\tau-t)x(\tau)e^{-i\omega\tau}d\tau,$$

which is referred to as $\hat{x}(t,\omega)$. The mixture in the time-frequency domain is expressed, $$\hat{x}(t,\omega)=\hat{s}(t,\omega)+\hat{r}(t,\omega).$$

It is assumed that a filter process can be modeled as $\hat{r}(t,\omega)=h(\omega)\hat{r}_0(t,\omega)$, such that mixing is, $$\hat{x}(t,\omega)=\hat{s}(t,\omega)+h(\omega)\hat{r}_0(t,\omega).$$

A time-frequency mask, m(t,ω), is created such that the mask preserves most of the desired source of power, $$\|m(t,\omega)\hat{s}(t,\omega)\|^2/\|m(t,\omega)\hat{r}(t,\omega)\|^2\approx 1,$$

and results in a high output signal to interference ratio, $$\|m(t,\omega)\hat{s}(t,\omega)\|^2>>\|m(t,\omega)\hat{r}(t,\omega)\|^2.$$

For such a mask, converting $m(t,\omega)\hat{x}(t,\omega)$ back into the time domain will create the desired signal, s(t). Thus, the goal of the estimated s(t) can be achieved by determining an appropriate time-frequency mask m(t,ω).

In one embodiment, the method described herein can be performed with the following steps:

1. Obtaining a mixture x(t) and a related side information signal $r_0(t)$.
2. Aligning x(t) and $r_0(t)$ using a suitable alignment technique known to those skilled in the art, such as manual or correlation-based alignment.

3. Computing a time-frequency representation $\hat{x}(t,\omega)$ and $\hat{r}(t,\omega)$.
4. Locating a portion of x(t) which is dominated by r(t). That is, finding a range of $t\in(t_0,t_1)$ such that $x(t)\approx r(t)$ for t in this range.
5. Estimating $|h(\omega)|$ (i.e., a filter) via, $$a(\omega) = \frac{\int_{\in(t_0,t_1)} |\hat{x}(t,\omega)\overline{\hat{r}_0(t,\omega)}| dt}{\int_{\in(t_0,t_1)} |\hat{r}(t,\omega)|^2 dt}$$

6. Generating a time-frequency mask, $$m(t,\omega) = \begin{cases} 1 & \text{if} \quad \frac{|\hat{x}(t,\omega)|^2}{a^2(\omega)|\hat{r}(t,\omega)|^2} > \alpha \\ 0 & \text{if} \quad \text{otherwise} \end{cases}$$

where $\alpha$ is set to maximize intelligibility. Although not so limited, a default value can be $\alpha=2$.

7. Applying the mask to the mixture and converting the result, $m(t,\omega)\hat{x}(t,\omega)$, back into the time domain.

Figure 2:
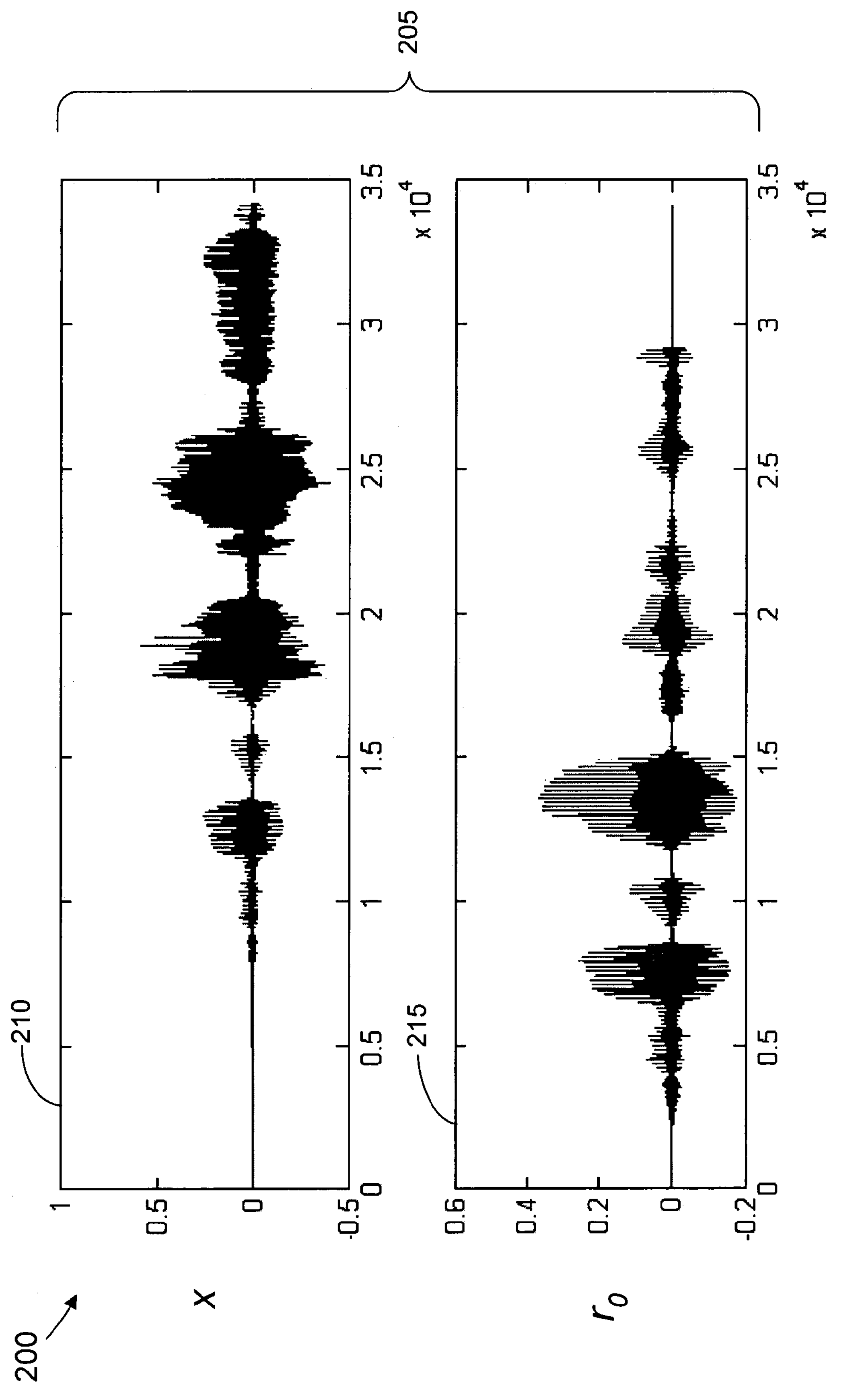
FIG. 2 depicts a pictorial time domain representation of a mixture x and an unwanted signal $r_0$, in accordance with one illustrative embodiment of the present invention.

An alternate embodiment of the method described herein will now be presented. Referring now to FIG. 1, a recorded mixture signal x and a played unwanted signal $r_0$ are acquired (at 105). The goal of the method described herein, as previously stated, is to produce a desired signal s from the recorded mixture x. Referring now to FIG. 2, a sample reading 200 is shown. The sample reading 200 comprises time domain representations 205 of the mixture signal x 210 and the unwanted signal $r_0$ 215. It is understood that the pictorial time domain representations 205 of various signals described herein are only used for illustrative purposes. The method described herein may be implemented with or without creating the pictorial time domain representations 205. As illustrated in the present disclosure, the horizontal axis of the time domain representations 205 represents a number of samples, and the vertical axis represents an amplitude of the signal. The number of samples depends on any of a variety factors, including sampling frequency, hardware/software constraints, and user-defined constraints, as known to those skilled in the art. Similarly, the representation of amplitude may depend on any of a variety of factors, including hardware/software constraints and user-defined constraints.

Referring again to FIG. 1, the mixture signal and the unwanted signal are aligned (at 110). As shown by a pair of guide lines 305 in FIG. 3, the mixture signal x 210 and the unwanted signal $r_0$ 215 of the sample reading 200 are misaligned by an estimated delay 310. The delay 310 can be estimated manually (e.g., through human optical inspection) or through cross-correlation. The unwanted signal $r_0$ is redefined, taking into account the delay 310 of FIG. 3. As shown in FIG. 4, $r_1$ represents a redefined unwanted signal 405 that is now at least substantially aligned (i.e., there may be error in estimating the delay 310) with the mixture signal x 210 of FIG. 2 and FIG. 3. The pictorial representation of the unwanted signal $r_0$ 215 is shown in FIG. 4 for comparative purposes.

Figure 5:
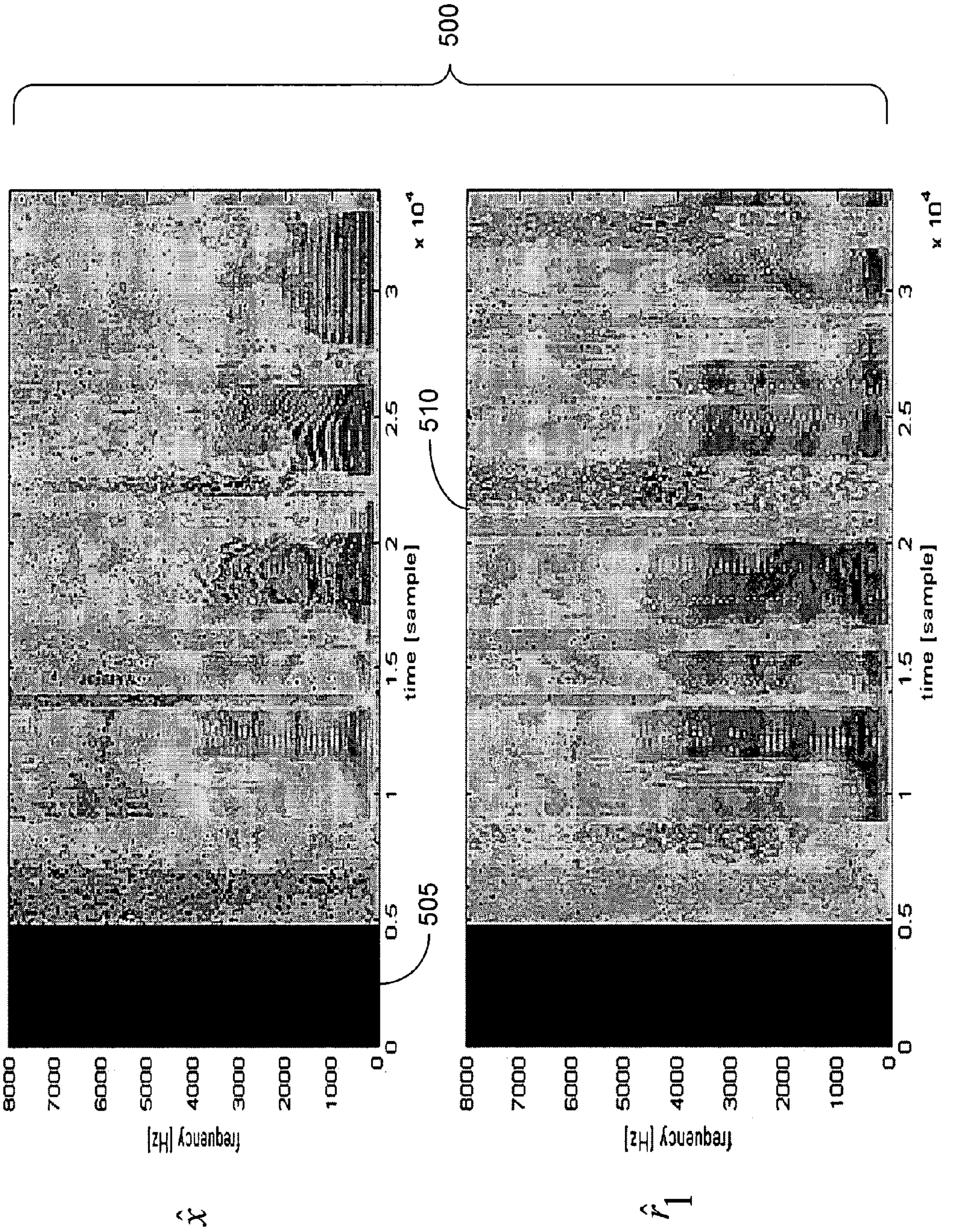
FIG. 5 depicts a pictorial time-frequency representation of the mixture $\hat{x}$ and the redefined unwanted signal $\hat{r}_1$, in accordance with one illustrative embodiment of the present invention.

Referring again to FIG. 1, time-frequency representations are computed (at 120). Referring now to FIG. 5, pictorial time-frequency representations 500 are shown for the mixture signal $\hat{x}$ 505 and the redefined unwanted signal $\hat{r}_1$ 510. As with the time domain representations 205, the pictorial time-frequency representations 500 presented herein are shown solely for illustrative purposes. The method described herein may be implemented with or without the pictorial time-frequency representations 500. As illustrated in the present disclosure, the horizontal axis of the time-frequency representations 500 represents a number of samples, and the vertical axis represents a frequency (in Hz) of the signal.

Figure 3:
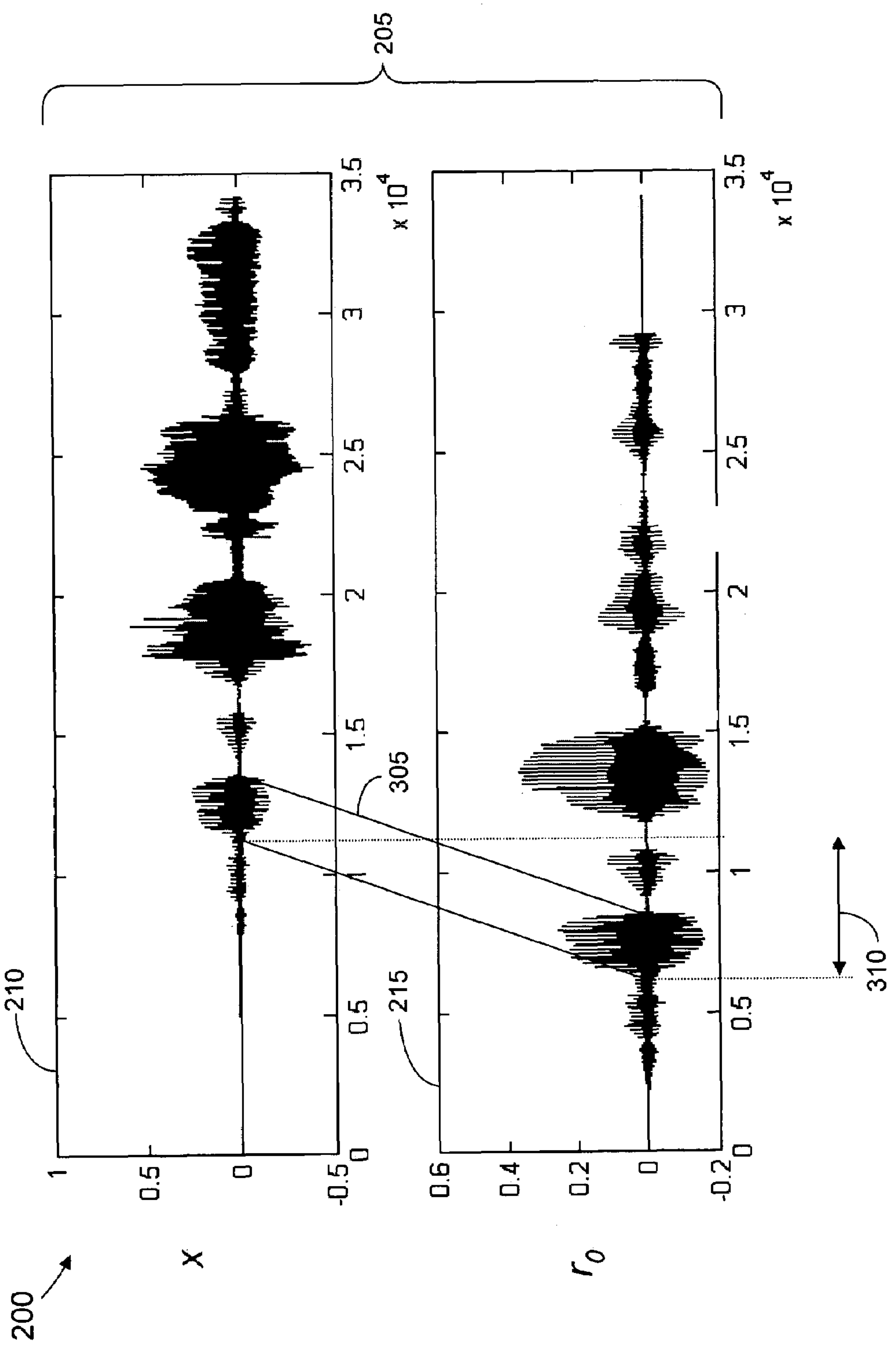
FIG. 3 depicts a pictorial time domain representation of the mixture x and the unwanted signal $r_0$ of FIG. 2, further illustrating a delay between the mixture x and the unwanted signal $r_0$, in accordance with one illustrative embodiment of the present invention.
Figure 4:
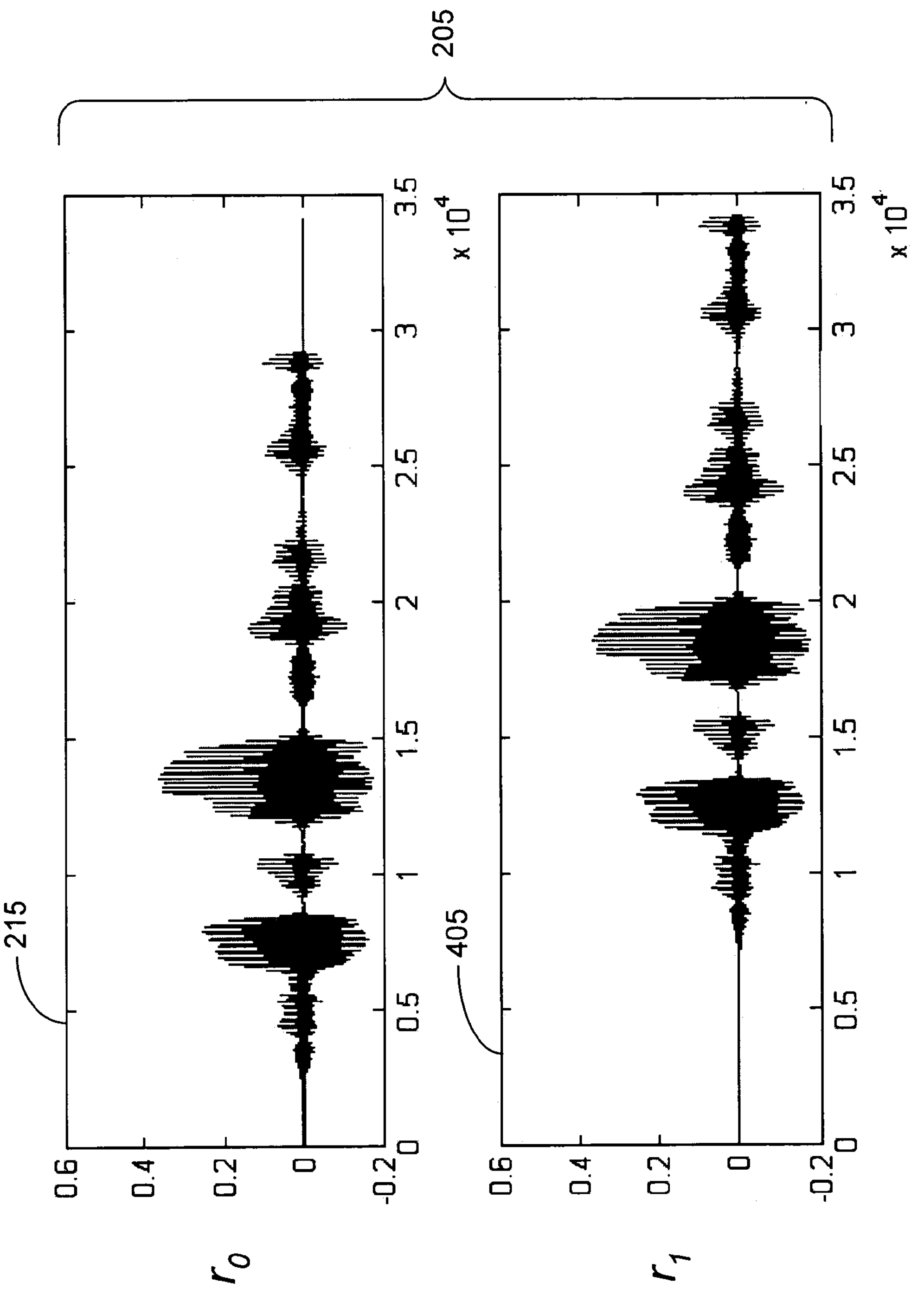
FIG. 4 depicts a pictorial time domain representation of the unwanted signal $r_0$ of FIG. 2 and FIG. 3 and a redefined unwanted signal $r_1$, in accordance with one illustrative embodiment of the present invention.
Figure 6:
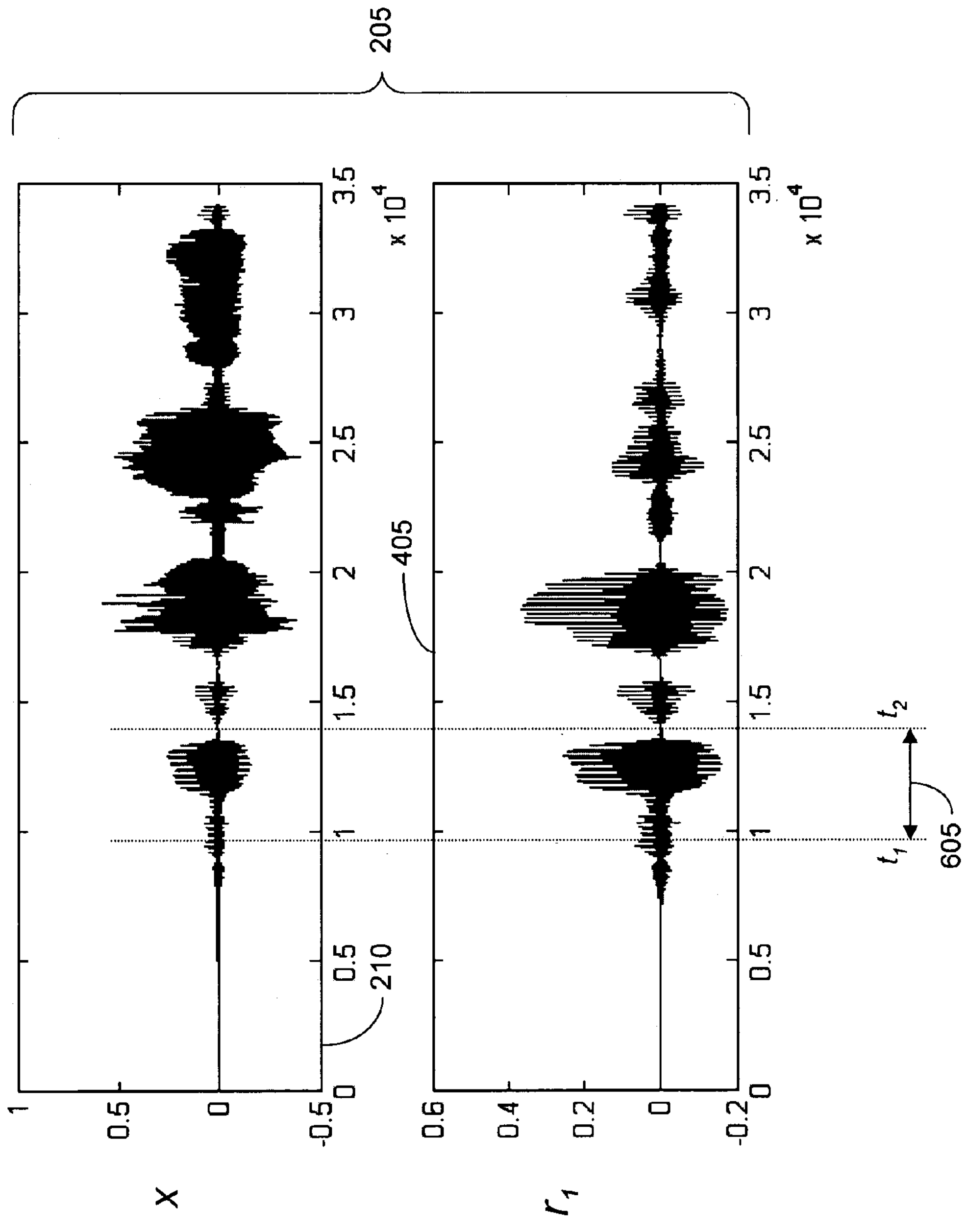
FIG. 6 depicts a pictorial time domain representation of the mixture x of FIG. 2 and FIG. 3 and the redefined unwanted signal $r_1$ of FIG. 4, further illustrating a time segment when only the redefined unwanted signal $r_1$ is present, in accordance with one illustrative embodiment of the present invention.

Referring again to FIG. 1, a segment of time is determined (at 125) when only the redefined unwanted signal $r_1$ 405 of FIG. 4 is present in the mixture signal x 210 of FIG. 2 and FIG. 3. As shown in FIG. 6, the segment 605 represented by the time interval $(t_1, t_2)$ illustrates a segment of time when only the redefined wanted signal $r_1$ 405 is present in the mixture signal x 210. In other words, this is the segment of time when the desired signal is not of a sufficient auditory level to be heard by a human or does not exist.

Referring again to FIG. 1, the value $\alpha(\omega)$ (i.e., modulus of the filter $h(\omega)$) is computed (at 130) from the time-frequency representations 500 of the mixture signal x 505 and the redefined unwanted signal $r_0$ 510 of FIG. 5. The value $\alpha(\omega)$ can be computed with the following equation, as described in greater detail above:

$$a(\omega) = \frac{\int_{\in(t_0,t_1)} |\hat{x}(t,\omega)\overline{\hat{r}_0(t,\omega)}| dt}{\int_{\in(t_0,t_1)} |\hat{r}(t,\omega)|^2 dt}.$$

Figure 7:
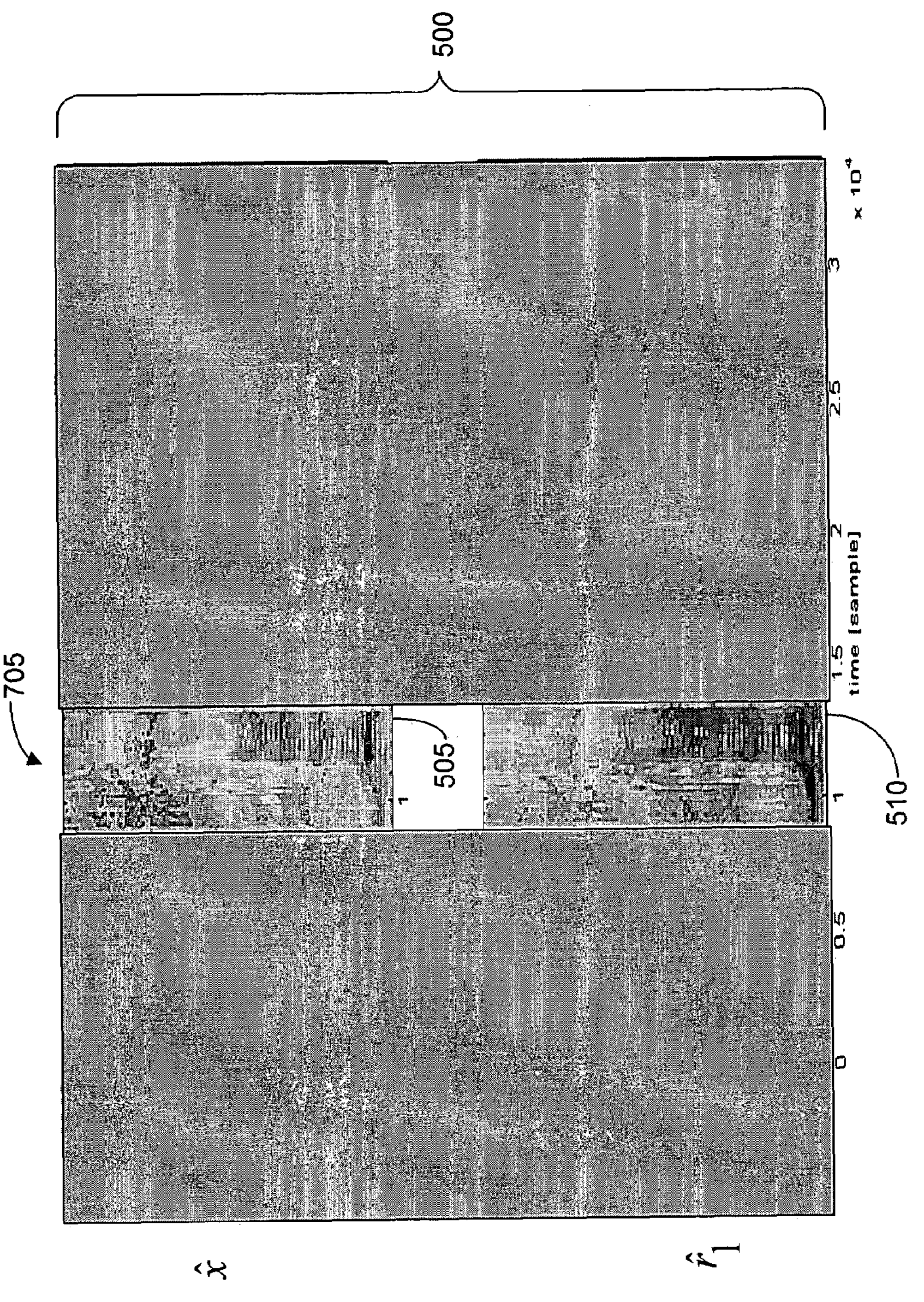
FIG. 7 depicts a pictorial time-frequency representation of the mixture $\hat{x}$ and the redefined unwanted signal $\hat{r}_1$ of FIG. 5, further illustrating $\alpha(\omega)$, in accordance with one illustrative embodiment of the present invention.

As shown herein, $\alpha(\omega)=|h(\omega)|$. Referring now to FIG. 7, the value $\alpha(\omega)$ 705 is illustrated with respect to the time-frequency representations 500 of the mixture signal $\hat{x}$ 505 and the redefined unwanted signal $\hat{r}_1$ 510 of FIG. 5.

Referring again to FIG. 1, a time-frequency mask is generated (at 135). The time-frequency mask can be generated using the following equation, as described in greater detail above:

$$m(t,\omega) = \begin{cases} 1 & \text{if} \quad \frac{|\hat{x}(t,\omega)|^2}{a^2(\omega)|\hat{r}(t,\omega)|^2} > \alpha \\ 0 & \text{if} \quad \text{otherwise} \end{cases}$$

Figure 8:
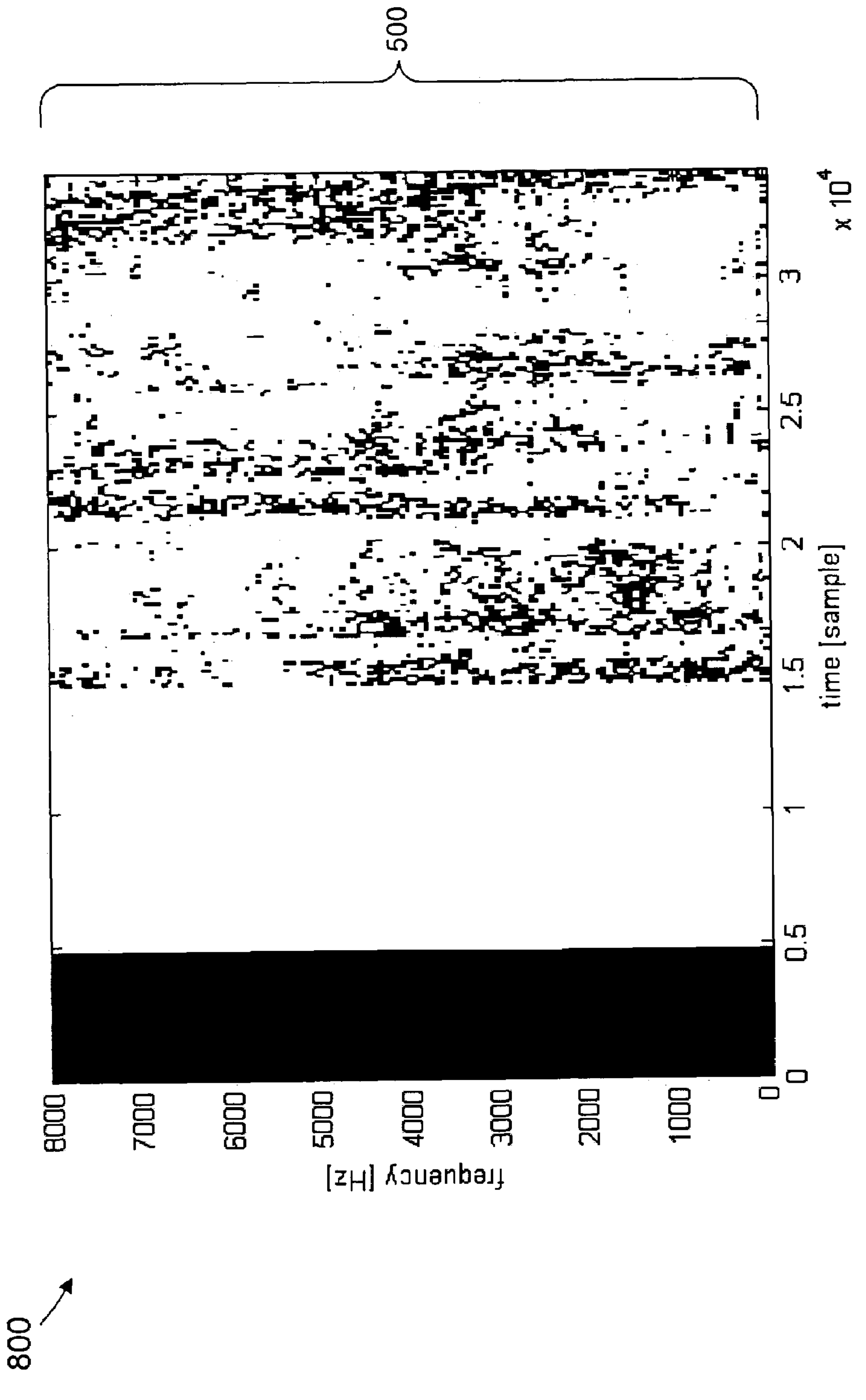
FIG. 8 depicts a pictorial representation of a time-frequency mask, in accordance with one illustrative embodiment of the present invention.

Referring now to FIG. 8, a pictorial representation of a time-frequency mask 800 consistent with the present embodiment is shown. The resulting time-frequency mask 800 can have a value of 0 or 1, depending on the time-frequency point. The lighter time-frequency points of the time-frequency mask 800 represent a 1 value. The darker time-frequency points of the time-frequency mask 800 represent a 0 value.

Figure 9:
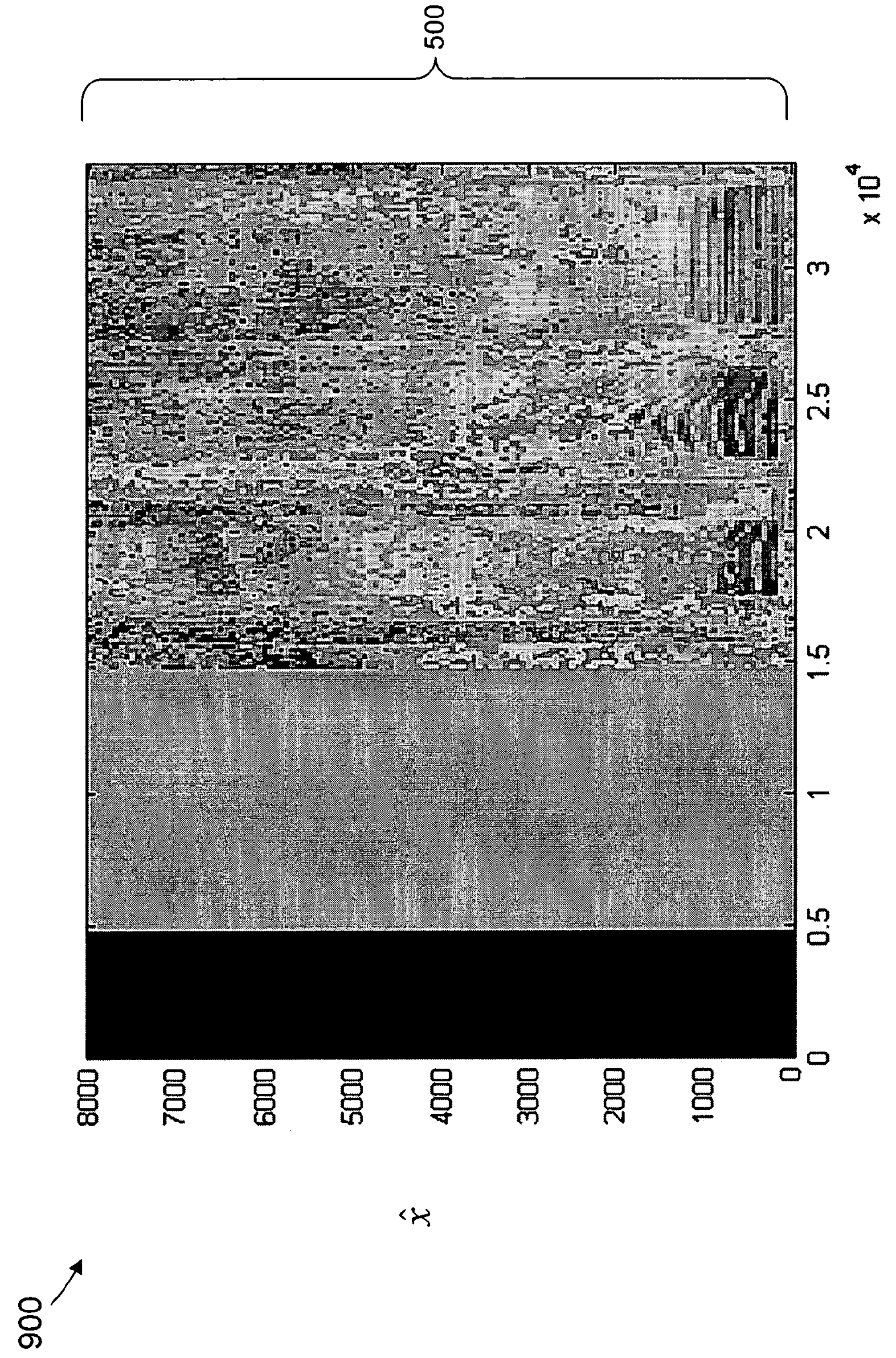
FIG. 9 depicts a pictorial time-frequency representation of the mixture $\hat{x}$ of FIG. 5 and FIG. 7 after the time-frequency mask of FIG. 8 is applied, in accordance with one illustrative embodiment of the present invention.

Referring again to FIG. 1, the time-frequency mask 800 of FIG. 8 is applied (at 140) on the mixture signal $\hat{x}$ of 505 of FIG. 5 and the value $s=\hat{x}$ mask is computed (at 140). Referring now to FIG. 9, a pictorial representation 900 of the mixture signal $\hat{x}$ of 505 of FIG. 5 after the time-frequency mask 800 of FIG. 8 is applied is shown. As illustrated, the lighter time-frequency points represent a b 1$|\hat{x}|$ value (i.e., $|\hat{x}|=1$), and the darker time-frequency points represent a 0 value (i.e., $|\hat{x}|=0$).

Referring again to FIG. 1, the value s is inverted (at 145) into a time domain to obtain an estimate of a desired signal.

Figure 10:
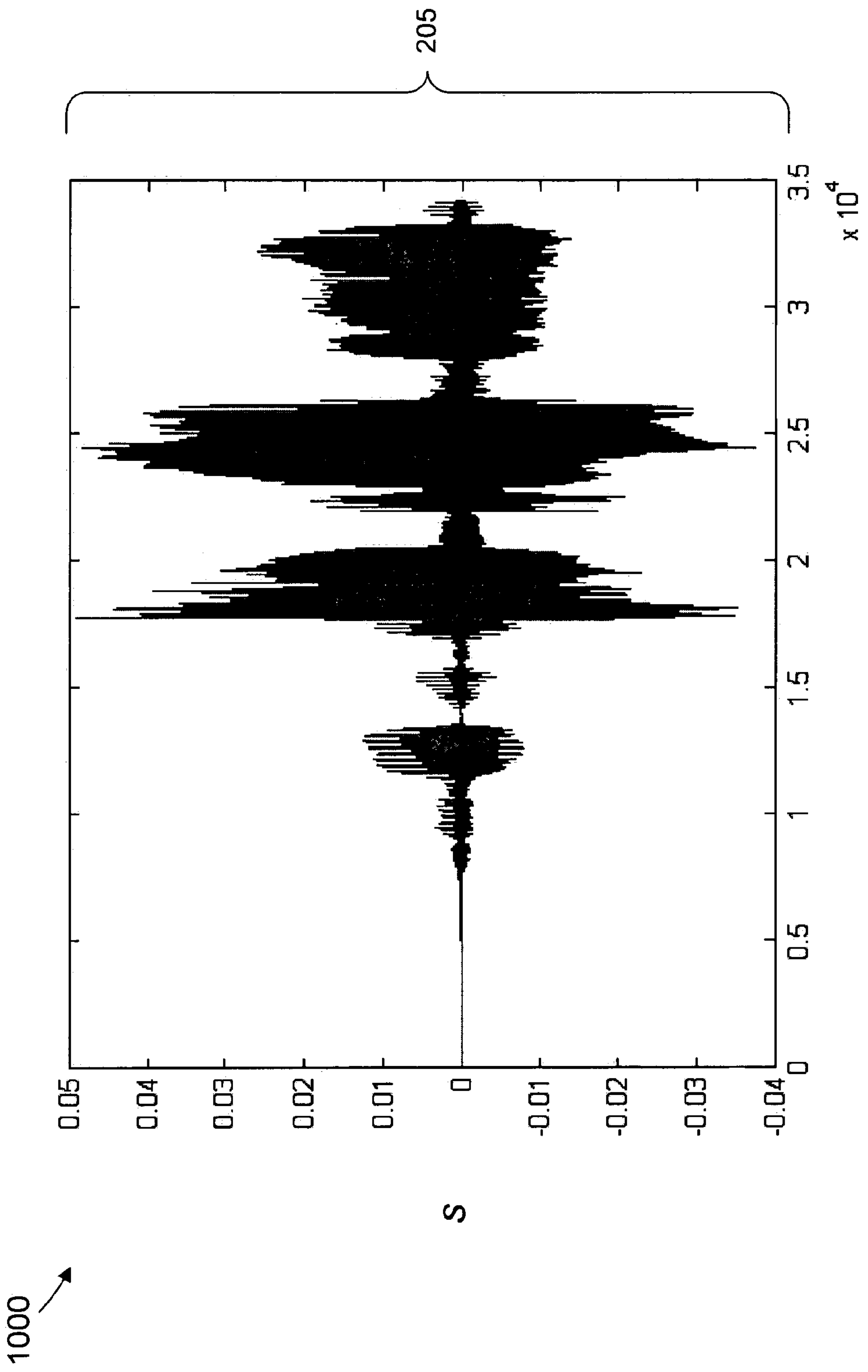
FIG. 10 depicts a time domain representation of a desired signal of the mixture x of FIG. 2, FIG. 3, and FIG. 6, in accordance with one illustrative embodiment of the present invention.

Inversion is well known to those skilled in the art. In one embodiment, the following equation, $$F^W(x(\cdot))(t,\omega) = \frac{1}{\sqrt{2\pi}} \int_{-\infty}^{\infty} W(\tau - t) x(\tau) e^{-i\omega\tau} d\tau$$

may be inverted. The result of computing the inverted equation is inverting s into the time domain. Referring now to FIG. 10, a pictorial time domain representation of the desired signal s 1000 is illustrated.

Although the embodiments illustrated herein show continuous time signals, it is understood that the present invention can be applied to sample signals. In discrete time, the windowed Fourier transform would be a windowed DFT (discrete time Fourier transform) and the estimates of the filter $|h(\omega)|$ would be finite sums over discrete time points for each frequency center. In another embodiment, the windowed Fourier transform can be replaced by a wavelet transform, which is a time-scale representation defined by:

$$G^W(x(\cdot))(t,s) = \frac{1}{\sqrt{s}} \int_{-\infty}^{\infty} W\left(\frac{\tau - t}{s}\right) x(\tau) d\tau.$$

The present invention differs from classical Widrow-Hoff techniques. By its design, the Widrow-Hoff algorithm estimates $h(\omega)$, and then, once estimated, the algorithm uses $h(\omega)$ to subtract a filtered-by-h signal r from x: $x - h*r$. Conversely, the method described herein uses only the modulus of $h(\omega)$, and therefore only the modulus of h is needed. As previously stated, the modulus of is $h(\omega)$ (i.e., $|h(\omega)|$) is denoted by $\alpha(\omega)$. Accordingly, the present invention does not estimate the phase but is based on instantaneous time-frequency magnitude estimates. As a result, the present invention is more robust to alignment errors than Widrow-Hoff techniques.

In an alternate embodiment of the present invention, time varying filter estimates (i.e., adaptive updates to $\alpha(\omega)$) may be implemented. This would require a manual segmentation of the data. More specifically, the data (i.e. the two recordings x and r) are split into segments of a particular time interval (e.g., five minutes). The method described herein is applied to each segment. In yet another embodiment of the present invention, the value of $\alpha(\omega)$ may be set to 1.

In an alternate embodiment of the present invention, the original recording $r_0(t)$ is recorded in the same environment/set-up as the recorded mixture $x(t)$. For example, this can be done by using the same recording device for recording the mixture (e.g., cassette tape recorder) and the same playing device for playing the unwanted signal (e.g., a CD player). The recording device and the playing device would be placed in approximately the same physical location in a room of similar geometric structure and materials. The recording device records the original recording $r_0(t)$ being played by the playing device. The original recording $r_0(t)$ is used to compute an estimate of $|\hat{r}(t,\omega)|$. That is, the original recording $r_0(t)$ would serve the role of $\alpha(\omega)\hat{r}(t,\omega)$ in the time-frequency mask generation.

In an alternate embodiment of the present invention, the following time-frequency mask may be used:

$$m(t,\omega) = 1_{\{\alpha(\omega)|\hat{r}_0(t,\omega)| > \beta\}}$$

where $\beta$ is set to maximize intelligibility of the output signal. A default choice of $\beta$ can be determined from statistics of $\alpha(\omega)\hat{r}(t,\omega)$ and $\hat{x}(t,\omega)$.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for eliminating or reducing an unwanted signal from a recorded mixture of a desired signal and an unwanted signal given a recording of the unwanted signal without the desired signal, comprising:

aligning the recorded mixture and the recording of the unwanted signal without the desired signal;

computing a time-frequency representation of the recorded mixture to create a time-frequency recorded mixture;

computing a time-frequency representation of the redefined recording of the unwanted signal to create a time-frequency redefined recording of the unwanted signal;

determining a segment of time when only the redefined recording of the unwanted signal is present in the recorded mixture;

computing a value $\alpha(\omega)$, wherein $\alpha(\omega)$ is a modulus of a Widrow-Hoff estimate;

generating a time-frequency mask using the value $\alpha(\omega)$, the time-frequency recorded mixture and the time-frequency redefined recording of the unwanted signal;

applying the time-frequency mask on the recorded mixture to compute a time-frequency desired signal; and inverting the time-frequency desired signal to create a desired signal.

2. The method of claim 1, wherein aligning the recorded mixture and the recording of the unwanted signal comprises:

estimating a delay between the recorded mixture and the recording of the unwanted signal; and redefining the recording of the unwanted signal with respect to a delay between the recorded mixture and the recording of the unwanted signal to create a redefined recording of the unwanted signal.

3. The method of claim 2, wherein estimating a delay between the recorded mixture and the recording of the unwanted signal comprises manually estimating the delay through optical inspection.

4. The method of claim 2, wherein estimating a delay between the recorded mixture and the recording of the unwanted signal comprises performing cross-correlation alignment.

5. The method of claim 1, wherein computing a time-frequency representation of the recorded mixture to create a time-frequency recorded mixture comprises computing $$F^W(x(\cdot))(t,\omega) = \frac{1}{\sqrt{2\pi}} \int_{-\infty}^{\infty} W(\tau - t) x(\tau) e^{-i\omega\tau} d\tau.$$

6. The method of claim 1, wherein computing a time-frequency representation of the redefined recording of the unwanted signal to create a time-frequency redefined recording of the unwanted signal comprises computing $$F^W(x(\cdot))(t,\omega)=\frac{1}{\sqrt{2\pi}}\int_{-\infty}^{\infty}W(\tau-t)x(\tau)e^{-i\omega\tau}d\tau.$$

7. The method of claim 1, wherein determining a segment of time when only the redefined recording of the unwanted signal is present in the recorded mixture comprises determining a segment of time when the desired signal is not of a sufficient auditory level to be heard by a human.

8. The method of claim 1, wherein determining a segment of time when only the redefined recording of the unwanted signal is present in the recorded mixture comprises determining a segment of time when the desired signal is not present in the mixture.

9. The method of claim 1, wherein computing a value $\alpha(\omega)$ comprises computing $$\alpha(\omega)=\frac{\int_{\in(t_0,t_1)}\left|\hat{x}(t,\omega)\overline{\hat{r}_0(t,\omega)}\right|dt}{\int_{\in(t_0,t_1)}|\hat{r}(t,\omega)|^2dt}.$$

wherein $\hat{x}(t,\omega)$ is a windowed Fourier transform, and $\hat{r}(t,\omega)$ is a filter process.

10. The method of claim 1, wherein computing a value $\alpha(\omega)$ comprises setting the value $\alpha(\omega)$ to 1.

11. The method of claim 1 wherein computing a value $\alpha(\omega)$ comprises computing adaptive updates to the value $\alpha(\omega)$.

12. The method of claim 1, wherein generating a time-frequency mask using the time-frequency recorded mixture and the time-frequency redefined original recording comprises computing $$m(t,\omega)=\begin{cases}1 & \text{if} \quad \frac{|\hat{x}(t,\omega)|^2}{a^2(\omega)|\hat{r}(t,\omega)|^2}>\alpha \\ 0 & \text{if} \quad \text{otherwise}\end{cases}.$$

13. The method of claim 1, wherein generating a time-frequency mask using the time-frequency recorded mixture and the time-frequency redefined recording of the unwanted signal comprises computing $$m(t,\omega)=1_{\left\{\frac{|\hat{x}(t,\omega)|}{|\hat{r}_2(t,\omega)|}>\alpha\right\}},$$

wherein $|\hat{r}_2(t,\omega)|$ is estimated from $r_2(t)$ and wherein $r_2(t)$ is a rerecording of the original recording in a similar environment and setup as the recorded mixture.

14. The method of claim 1, wherein generating a time-frequency mask using the time-frequency recorded mixture and the time-frequency redefined original recording comprises computing $m(t,\omega)=1_{\{\alpha(\omega)|\hat{r}_0(t,\omega)|>\beta\}}$.

15. The method of claim 1, wherein inverting the time-frequency desired signal to create a desired signal comprises computing an inverted $$F^W(x(\cdot))(t,\omega)=\frac{1}{\sqrt{2\pi}}\int_{-\infty}^{\infty}W(\tau-t)x(\tau)e^{-i\omega\tau}d\tau.$$

16. A computer-readable medium having instructions stored thereon for execution by a processor to perform a method for eliminating or reducing an unwanted signal from a recorded mixture of a desired signal and an unwanted signal given a recording of the unwanted signal without the desired signal, comprising:

aligning the recorded mixture and the recording of the unwanted signal without the desired signal;

computing a time-frequency representation of the recorded mixture to create a time-frequency recorded mixture;

computing a time-frequency representation of the redefined original recording to create a time-frequency redefined original recording;

determining a segment of time when only the redefined original recording is present in the recorded mixture;

computing a value $\alpha(\omega)$, wherein $\alpha(\omega)$ is a modulus of a Widrow-Hoff estimate;

generating a time-frequency mask using the time-frequency recorded mixture and the time-frequency redefined original recording;

applying the time-frequency mask on the recorded mixture to compute a time-frequency desired signal; and inverting the time-frequency desired signal to create a desired signal.

17. A method for eliminating or reducing an unwanted signal from a recorded mixture of a desired signal and an unwanted signal given a recording of the unwanted signal without the desired signal, comprising:

aligning the recorded mixture and the recording of the unwanted signal without the desired signal;

computing a time-scale representation of the recorded mixture to create a time-scale recorded mixture;

computing a time-scale representation of the redefined original recording to create a time-scale redefined original recording;

determining a segment of time when only the redefined original recording is present in the recorded mixture;

computing a value $\alpha(\omega)$, wherein $\alpha(\omega)$ is a modulus of a Widrow-Hoff estimate;

generating a time-scale mask using the value $\alpha(\omega)$, the time-scale recorded mixture and the time-scale redefined original recording;

applying the time-scale mask on the recorded mixture to compute a time-scale desired signal; and inverting the time-scale desired signal to create a desired signal.

* * * * *